United States Patent [19]
Stephens

[11] 3,800,354
[45] Apr. 2, 1974

[54] UNIVERSAL GRILL CLEANER

[76] Inventor: Donald L. Stephens, 7806 S. College Ave., Ottawa, Kans. 74136

[22] Filed: Sept. 22, 1972

[21] Appl. No.: 291,195

[52] U.S. Cl............... 15/236 R, 15/104.04, 99/444
[51] Int. Cl......................... A47l 17/06, A47j 49/00
[58] Field of Search........ 126/173, 25; 15/104, 105, 15/236 R, 104.16, 104.15, 104.04, 104.03, 142, 143, 144, 145; 99/444, 339, 352, 385, 445; 294/9, 10, 14; 7/1 R; 30/169–172; 29/81 F, 81 G; 81/9.5 A, 9.5 B

[56] References Cited
UNITED STATES PATENTS

| | | | |
|---|---|---|---|
| 1,754,830 | 4/1930 | MacClatchie | 15/104.03 |
| 824,947 | 7/1906 | Nordstrom | 15/104.03 |
| 2,489,443 | 11/1949 | Williams | 15/104.03 |
| 2,814,814 | 12/1957 | Simmons | 15/104.03 |
| 1,405,930 | 2/1922 | McGrath | 29/81 F |
| 3,667,080 | 6/1972 | Persson | 15/236 R |

FOREIGN PATENTS OR APPLICATIONS

| | | | |
|---|---|---|---|
| 6,427 | 3/1911 | Great Britain | 15/104.03 |
| 71,771 | 11/1893 | Germany | 126/173 |
| 345,617 | 5/1960 | Switzerland | 15/104.04 |

*Primary Examiner*—Leon G. Machlin
*Attorney, Agent, or Firm*—D. A. N. Chase

[57] ABSTRACT

A tool for cleaning the parallel bars of a grill irrespective of the spacing between adjacent bars over a range that accommodates standard grill sizes. A pair of spaced discs are rotatably mounted on one end of an operating arm provided with a handle on its opposite end. Each disc is of a hard metal material and has uniformly spaced, semi-circular notches in its periphery, presenting radial projections between adjacent notches that are tapered to a point. The arm comprises a pair of flexible, side-by-side rods that independently support the two discs for limited movement toward and away from each other to improve the seating of the bars in the notches over the range of spacing accommodated. Using two discs, at least three bars are scraped when force is applied to the arm and it is shifted in directions parallel to the bars with the discs in engagement therewith.

9 Claims, 8 Drawing Figures

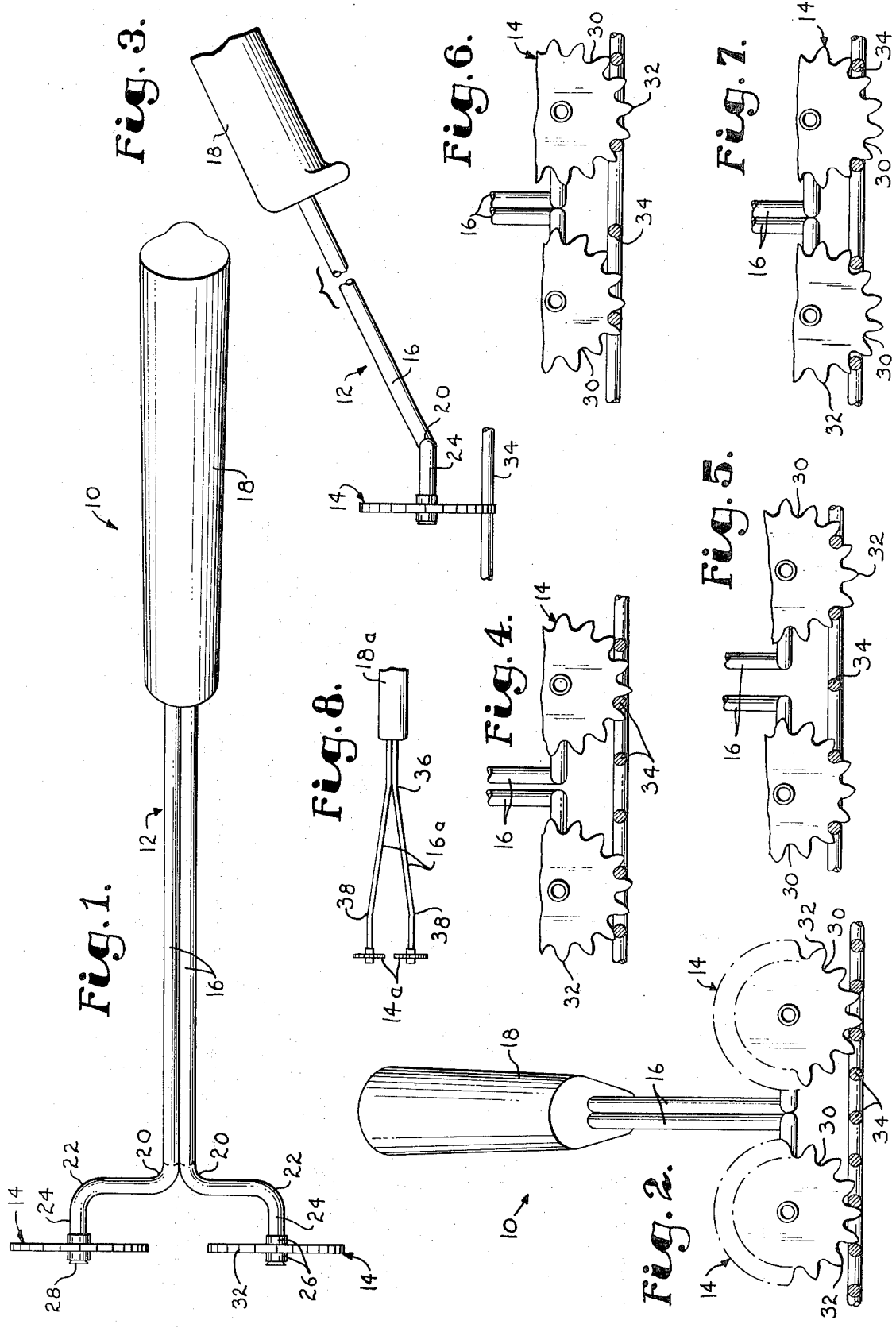

UNIVERSAL GRILL CLEANER

This invention relates to improvements in tools for cleaning deposits from the bars of grills and the like and, more particularly, to a tool that accommodates a wide range of bar spacings.

Grills for cooking over the heat of charcoal or a gas flame have become increasingly popular in recent years and now enjoy widespread household use. However, such grills are inherently difficult to clean due to the buildup of deposits during normal use, particularly on the bars of the grill upon which the food is cooked. The usual practice is to scrape or clean the bars of the grill in some manner before each use, and wire brushes or similar devices have been used in the past for this purpose.

Wire brushes, however, present an inherent disadvantage in that they are not self-cleaning and soon clog and become useless. Thus, to be efficient and convenient to use and handle, the scraping tool must be self-cleaning and yet capable of accommodating the various bar spacings commonly employed in grills of this type. The spacing may be as small as approximately three-eighths of an inch or as large as approximately seven-eighths of an inch in household grills of the type in general use at the present time.

It is, therefore, the primary object of the present invention to provide a universal tool for cleaning deposits from the bars of grills, wherein such tool is capable of accommodating a wide range of bar spacings with efficient cleaning action throughout.

As a corollary to the foregoing object, it is an important aim of this invention to provide a tool as aforesaid which will thoroughly clean the arcuate surfaces presented by the grill bars in order to remove deposits from both the top and the sides thereof.

Another important object of the present invention is to provide a tool as aforesaid which employs a disc shaped cleaning element and, in its preferred form, has a pair of such cleaning discs that serve as scrapers to remove the deposits from the bars, and wherein the pair of discs are arranged so that at least three bars at a time will be cleaned throughout a range of spacing of the bars that may vary by a factor of two or more.

Still another important object of the present invention is to provide a tool as aforesaid wherein such cleaning discs are supported by a flexible mounting to improve the seating of the bars in notches provided in the discs and increase the bar spacing variation that may be accommodated by the tool.

Yet another important object of the present invention is to provide a tool as aforesaid which is hand operated and may be conveniently and easily used while the grill is hot.

Furthermore, it is an important object of this invention to provide cleaning discs for a tool of this type having specially configured peripheries to enhance the cleaning or scraping action and the bar spacing that may be accommodated by the tool.

In the drawing:

FIG. 1 is a top plan view of the tool of the present invention;

FIG. 2 is an end view of the tool, showing the discs thereof in engagement with the parallel bars of a grill;

FIG. 3 is a fragmentary, side view of the tool, also showing the same in engagement with bars to be cleaned;

FIGS. 4–7 are fragmentary views similar to FIG. 2 showing the manner in which the tool accommodates different bar spacings; and FIG. 8 is a fragmentary, top plan view on a reduced scale showing a modified form of the tool of the present invention.

The tool is broadly denoted by the numeral 10 and, as basic components thereof, includes an operating arm 12 and a pair of cleaning discs 14. The operating arm 12 comprises a pair of flexible, side-by-side members or rods 16 securely held at one end thereof by a handle 18. Opposite the handle 18, each of the rods 16 undergoes a first right angle bend 20 and a second right angle bend 22 to present an offset tip 24. The discs 14 are rotatably mounted on respective tips 24 in any suitable manner and may, as illustrated, be held between retainers 26 and the ends of the tips peened as shown at 28.

Each of the discs 14 is composed of a hard material such as hardened steel or tool steel, and has a series of uniformly spaced, semi-circular notches 30 in its periphery. By virtue of the notches 30, radial projections 32 are thus provided between adjacent notches 30, and each of these projections 32 is tapered to present a point as may be clearly seen in FIGS. 2 and 4–7. The notches 30 are provided completely around the periphery of each disc 14, thus notches 30 are always available for receiving grill bars 34 irrespective of the angular positions of the discs.

In the embodiment of the invention shown in FIGS. 1–7, it may be seen that the rods 16 normally touch each other (or nearly so) from the handle 18 to the bends 20. Since the bends 20 and 22 form two right angles, the axes of rotation of the discs 14 defined by the offset tips 24 are substantially parallel. It should also be noted that the offset tips 24 provide significant spacing between the discs 14 for purposes to be discussed hereinafter. The rods 16 are preferably composed of steel rod stock or other suitable metallic material that is strong and durable and yet sufficiently flexible to permit the rods to spread to a limited degree when force is applied.

Referring to the modified form of the tool shown in FIG. 8, it may be seen that the ends of the rods 16a remote from the discs 14a are embedded and held in the handle 18a, but that the rods 16a diverge at 36 and are spaced apart from that point to the ends thereof carrying the discs 14a. The construction is otherwise the same as in FIGS. 1–7. This modified form permits the rods 16a to spread and increase the spacing between the discs 14a more readily than in the previously described embodiment. The importance of the flexible mounting of the discs 14 or 14a will be appreciated hereinafter when the operation of the tool is discussed in detail.

OPERATION

FIG. 2 illustrates the minimum spacing of the parallel grill bars 34 that would normally be accommodated by the tool 10. It may be noted that the discs 14 are disposed in a common plane and spaced a sufficient distance apart to permit the notches 30 thereof to receive (at least partially) four of the bars 34 in FIG. 2. A slightly greater spacing of the bars 34 in FIG. 2 would permit the four bars directly beneath the discs 14 to seat fully within the four corresponding notches 30 of the discs 14. To clean the bars, the handle 18 is grasped and force is applied to the operating arm 12 while the operator simultaneously shifts the arm in directions parallel to the bars 34, a scraping action being produced within the four notches 30 and by the edges of the radial projections 32 adjacent these four notches.

Now referring to FIG. 4, it may be appreciated that the bars 34 are spaced apart a greater distance than in FIG. 2, and that the rods 16 of the operating arm 12 have shifted laterally apart to slightly increase the spacing between the axes of the discs 14 to permit the discs to accommodate the wider bar spacing. Two of the bars 34 in FIG. 4 are fully seated in corresponding notches 30 in the respective discs 14, and two other bars are in sufficient engagement with the edges defined by the notches and projections of the discs 14 to result in efficient scraping action as the tool is manipulated.

In FIG. 5 the bars 34 have a slightly greater spacing than in FIG. 4, and the rods 16 are now spread to a significant extent to permit four of the bars 34 in FIG. 5 to seat fully within corresponding notches 30. FIG. 5 represents a condition wherein significant force has been applied to the tool by the operator grasping the handle 18, and the full significance of the flexible mounting of the discs 14 may be appreciated since otherwise it would not be possible to fully seat four of the bars 34 within the notches 30 for effective scraping action.

FIGS. 6 and 7 illustrate progressively greater spacing of the bars 34 and the capability of the tool to accommodate these spacings. In FIG. 6 three of the bars 34 are in sufficient engagement with the discs 14 for effective cleaning, and in FIG. 7 all four of the bars 34 illustrated are seated to some degree within corresponding notches 30. The bar spacing in FIG. 2 may be considered representative of a spacing of approximately ⅜ inch between adjacent bars, whereas the spacing in FIG. 7 is representative of ⅞ inch between bars. Accordingly, it may be appreciated that the tool of the present invention will accommodate bar spacings over a range of somewhat over a factor of two between the narrowest and the widest and still provide effective engagement with at least three of the bars of the grill.

The modified form illustrated in FIG. 8 operates in identically the same manner as described hereinabove in that the rods 16a also support the discs 14a for limited movement toward and away from each other upon the application of force in usage of the tool.

Besides the independent support for the discs 14 or 14a provided by the rods 16 or 16a of the present invention, it may be appreciated in FIG. 3 that the operating arm 12 is also arranged to facilitate grasping of the tool by the handle 18 for manual manipulation thereof. Comparing FIG. 3 with FIG. 1, it may be seen that the bend 20 in each rod 16 is actually a double bend that allows the major portion of the arm 12 to diverge from the axes of the discs 14 as the arm extends away from the discs. Therefore, the hand of the operator grasping the handle 18 is spaced a significant distance above the bars 34 so that they may be cleaned while the grill is hot, which is often desired. Likewise, in the modification of FIG. 8, each of the rods 16a has a bend at 38 for the same purpose.

In order to provide an effective scraping action it is important that the tool be constructed so that the operator may hold the discs 14 in firm engagement with the bars 34 while simultaneously shifting the operating arm 12 in directions parallel to the bars 34. To this end, the arm 12 extends away from the discs 14 in a plane disposed at substantially a right angle with a plane perpendicular to the axes of rotation of the discs 14, thereby allowing the operator by grasping the remote end of arm 12 (handle 18) to apply significant force to the discs 14 while shifting them axially along the bars 34. Accordingly, with the high applied scraping force, it is particularly important that the discs 14 be composed of a hard material as discussed above to both provide effective scraping action and resist wear and dulling of the peripheral edges of the discs that would otherwise occur with repeated use of the tool.

Furthermore, in certain applications where the superior capabilities of the dual disc tool are not required, a tool constructed in accordance with the principles of the present invention may employ a single disc on a straight operating arm, in which case an adjacent pair of grill bars would be engaged by the notches and projections of the disc over a limited range of bar spacing.

Having thus described the invention, what is claimed as new and desired to be secured by Letters Patent is:

1. A tool for cleaning the parallel bars of a grill or the like irrespective of the spacing between adjacent bars within a predetermined range, said tool comprising:
   a disc having a series of notches in its periphery presenting radial projections at said periphery between adjacent pairs of said notches; and
   an operating arm having means at one end thereof mounting said disc thereon, said notches being spaced apart a distance to permit the notches to receive and the projections to engage an adjacent pair of said bars spaced within said range when the disc is brought into contact therewith, whereby the bars are cleaned by a scraping action when force is applied to the arm and the latter is shifted in directions parallel to the bars,
   said disc being composed of a relatively hard material capable of scraping deposits from said bars and resisting wear and dulling of the peripheral edge of the disc whth repeated use of the tool,
   said arm extending away from said disc in a plane disposed at substantially a right angle with a plane perpendicular to the axis of the disc, and having an end portion remote from said disc provided with a handle to permit the tool to be grasped and manually manipulated.

2. The tool as claimed in claim 1, wherein said disc is mounted on the arm for rotation about said axis, said notches being uniformly spaced around said periphery.

3. The tool as claimed in claim 1, wherein each of said notches is of generally semi-circular configuration, and wherein each of said projections extends radially outwardly beyond the pair of notches between which it is disposed and is tapered to present a point, whereby to improve the scraping action on adjacent pairs of bars where the spacing therebetween is near the limits of said range.

4. A tool for cleaning the parallel bars of a grill or the like irrespective of the spacing between adjacent bars within a predetermined range, wherein said spacing within said range may vary by at least a factor of two between the narrowest and the widest, said tool comprising:

a pair of discs, each having a plurality of notches in its periphery uniformly spaced therearound, said notches in each disc presenting radial projections at the periphery of the disc between adjacent pairs of said notches; and an operating arm having means at one end thereof mounting said discs for rotation about generally parallel axes, said mounting means spacing said discs apart a sufficient distance to permit the notches to receive and the projections to engage at least three of said bars throughout said range of spacing of the bars, whereby to clean the bars by a scraping action when force is applied to the arm and the latter is shifted in directions parallel to the bars with the discs in engagement therewith, said discs being composed of a relatively hard material capable of scraping deposits from said bars and resisting wear and dulling of the peripheral edges of the discs with repeated use of the tool.

5. The tool as claimed in claim 4, wherein said arm includes structure supporting said discs for limited movement toward and away from each other upon said application of force to the arm, whereby to improve the seating of the bars in the notches over said range of spacing.

6. The tool as claimed in claim 4, wherein said arm includes a pair of flexible, side-by-side members independently supporting respective discs for limited movement toward and away from each other upon said application of force to the arm, whereby to improve the seating of the bars in the notches over said range of spacing.

7. The tool as claimed in claim 4, wherein said arm extends away from said discs in a plane disposed at substantially a right angle with a plane perpendicular to the axes of rotation of the discs, said arm having an end portion remote from said discs provided with a handle to permit the tool to be grasped and manually manipulated.

8. The tool as claimed in claim 7, wherein said arm adjacent said remote end portion diverges from said axes as it extends away from said discs.

9. A tool as claimed in claim 4, wherein each of said notches is of generally semi-circular configuration, each of said projections being tapered to present a point.

* * * * *

UNITED STATES PATENT OFFICE
CERTIFICATE OF CORRECTION

Patent No. 3,800,354          Dated April 2, 1974

Inventor(s)    Donald L. Stephens

It is certified that error appears in the above-identified patent and that said Letters Patent are hereby corrected as shown below:

On the cover sheet the patentee's address should read -- 7806 South College Avenue, Tulsa, Oklahoma 74136 --.

Signed and sealed this 24th day of September 1974.

(SEAL)
Attest:

McCOY M. GIBSON JR.           C. MARSHALL DANN
Attesting Officer             Commissioner of Patents